United States Patent
Wichelhaus et al.

(10) Patent No.: US 6,479,103 B1
(45) Date of Patent: Nov. 12, 2002

(54) CONDUCTIVE ORGANIC COATINGS

(75) Inventors: Winfried Wichelhaus, Mettmann (DE); Wolfgang Lorenz, Erkrath (DE); Andreas Kunz, Remscheid (DE); Wolfgang Krey, Wuppertal (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/530,869

(22) PCT Filed: Oct. 28, 1998

(86) PCT No.: PCT/EP98/06824

§ 371 (c)(1),
(2), (4) Date: Aug. 7, 2000

(87) PCT Pub. No.: WO99/24515

PCT Pub. Date: May 20, 1999

(30) Foreign Application Priority Data

Nov. 5, 1997 (DE) .......................... 197 48 764

(51) Int. Cl.[7] .................................. B05D 5/00
(52) U.S. Cl. .................. 427/327; 575/528; 575/452; 574/612; 574/871; 574/589; 574/432; 574/424; 574/437; 106/14.44; 427/386; 427/404; 427/405; 427/406; 427/410; 427/388.1
(58) Field of Search .................... 525/528; 524/612, 524/871, 589, 452, 432, 434, 437; 106/14.44; 427/388.1, 386, 404, 405, 406, 410, 327

(56) References Cited

U.S. PATENT DOCUMENTS

| | | | |
|---|---|---|---|
| 4,748,194 A | 5/1988 | Geeck | 523/427 |
| 4,775,600 A | 10/1988 | Adaniya et al. | 428/623 |
| 5,221,707 A * | 6/1993 | Chihara et al. | |
| 5,429,880 A | 7/1995 | Kubota et al. | 428/623 |
| 5,470,413 A * | 11/1995 | Cedarleaf | |

FOREIGN PATENT DOCUMENTS

| | | |
|---|---|---|
| DE | 36 40 662 | 10/1987 |
| DE | 34 12 234 | 10/1988 |
| EP | 0 380 024 | 8/1990 |
| EP | 0 573 015 | 12/1993 |
| WO | WO94/09051 | 4/1994 |

OTHER PUBLICATIONS

Chemical Abstracts, vol. 114, No. 20, (1991) XP002100271.

Chemical Abstracts, vol. 110, No. 4, (1989) XP002100272.

* cited by examiner

Primary Examiner—Robert Dawson
Assistant Examiner—Kuo-Liang Peng
(74) Attorney, Agent, or Firm—Stephen D. Harper; Arthur G. Seifert

(57) ABSTRACT

Conductive and weldable anti-corrosive compositions based on (blocked) polyurethane resins, epoxy resins, together with curing agents containing nitrogen and conductive extenders are suitable for coating metal surfaces, in particular sheet steel in the coil coating process. These compositions are distinguished by a low stoving temperature, a distinct reduction in white rust on galvanized sheet steel in the salt spray test and by an improvement in the adhesion of the organic coating on the metallic substrate. These coatings furthermore also achieve adequate corrosion protection with a thin chromium coating, preferably also in Cr-free pretreatment processes. Sheet metal coated in this manner may be spot welded using any conventional processes.

20 Claims, No Drawings

CONDUCTIVE ORGANIC COATINGS

FIELD OF THE INVENTION

This invention relates to conductive and weldable anti-corrosive compositions for coating metal surfaces and to a process for coating metal surfaces with electrically conductive organic coatings.

BACKGROUND OF THE INVENTION

In the metals processing industry, in particular in automotive construction, the metallic components of the products must be protected from corrosion. According to the conventional prior art, this is achieved by initially coating the sheet metal in the rolling mill with anti-corrosive oils and optionally with drawing greases before forming and stamping. In automotive construction, sheet metal components appropriately formed for bodywork or bodywork components are stamped out and formed by deep drawing using such drawing greases or oils and then generally joined together by welding and/or crimping and/or adhesive bonding and then elaborately cleaned. Anti-corrosive surface pretreatment, such as phosphating and/or chromating, is then performed, whereupon a first lacquer layer is applied onto the components by electrocoating. Especially in the case of automotive bodywork, this first electrocoating is followed by the application of further lacquer layers.

There is a need to find simpler production processes which make it possible to weld already precoated sheet metal and to electrocoat it in a proven manner. There is thus a range of processes in which, after phosphating and/or chromating, an organic coating which is conductive to a greater or lesser degree is applied in the so-called coil coating process. These organic coatings should generally be of a composition such that they have sufficient electrical conductivity not to impair the electrical spot welding process. It should moreover be possible to coat these coatings with conventional electrocoating lacquers. It should furthermore be possible to stamp and form the sheet metal coated in this manner with reduced usage of deep drawing greases or oils. Recently, especially in the automotive industry, galvanised and/or alloy-galvanised sheet steel and aluminum and magnesium sheet have increasingly been used in addition to standard sheet steel.

It is in principle known to coat sheet steel with organic coatings which are weldable and are applied directly in the rolling mill using the so-called coil coating process.

DE-C-3412234 thus describes a non-blocking and weldable anti-corrosive primer for electrolytically thin galvanised, phosphated or chromated and formable sheet steel. This anti-corrosive primer consists of a mixture of over 60% zinc, aluminum, graphite and/or molybdenum disulfide and another anti-corrosive pigment and 33 to 35% of an organic binder, together with about 2% of a dispersion auxiliary or catalyst. Polyester resins and/or epoxy resins and derivatives thereof are proposed as the organic binder. It is assumed that this technology forms the basis of the coating composition known in the industry under the name "Bonazinc 2000". Although this process offers some advantages in comparison with the above-stated method (temporary corrosion protection with anti-corrosive oils, followed by subsequent degreasing once the metal components have been joined), the process described in DE-C-3412234 is still in great need of improvement:

this coating is not sufficiently spot weldable the stoving temperature for such coatings at a peak metal temperature (PMT) of 250 to 260° C. is still too high.

Many recent steels with the "bake-hardening" effect cannot be used at such high stoving temperatures.

lacquer adhesion onto the pretreated substrates, preferably galvanised steels, is still inadequate, especially if the sheets are subjected to relatively severe forming in the press.

According to the teaching of DE-C-3412234, the organic binder may consist of polyester resins and/or epoxy resins and derivatives thereof. An epoxy/phenyl precondensate, an epoxy ester and linear, oil-free terephthalic acid based copolyesters are explicitly mentioned.

EP-A-573015 describes organically-coated composite sheet steel consisting of a surface coated on one or two sides with zinc or zinc alloy, which surface is provided with a chromate film and, thereon, an organic coating having a film thickness of 0.1 to 5 μm. The organic coating is formed from a primer composition consisting of an organic solvent, an epoxy resin having a molecular weight of between 500 and 10000, an aromatic polyamine and a phenol or cresol compound as accelerator. The primer composition furthermore contains a polyisocyanate and colloidal silica. According to this document, the organic coating is preferably applied to a dry film thickness of 0.6 to 1.6 μm as layers thinner than 0.1 μm are too thin to provide corrosion protection. Film thicknesses of above 5 μm, however, impair weldability. DE-A-3640662 similarly describes surface treated sheet steel comprising sheet steel provided with coating of zinc or zinc alloy, a chromate film formed on the surface of the sheet steel and a layer of a resin composition formed on the chromate film. This resin composition consists of a basic resin, which is produced by reacting an epoxy resin with amines, together with a polyisocyanate compound. This film too may only be applied to dry film thicknesses of less than about 3.5 μm as weldability is severely reduced at greater film thicknesses.

EP-A-380024 describes organic coating materials based on a bisphenol A type epoxy resin having a molecular weight of between 300 and 100000, together with a polyisocyanate or blocked polyisocyanate, pyrogenic silica and at least one organic colouring pigment. In this process too, pretreatment with chromate to form a thick Cr coating is required. The organic layer cannot be thicker than 2 μm as sheets having thicker organic coats cannot satisfactorily be spot welded and the properties of the electrocoating lacquer applied onto the organic coating are degraded.

SUMMARY OF THE INVENTION

An object thus arose of providing coating compositions which satisfy the automotive industry's requirements in all respects. In comparison with the prior art, it is intended to improve the following properties of the organic coating compositions suitable for the coil coating process:

lower stoving temperature preferably no higher than 210 to 235° C. PMT distinct reduction in white rust on galvanised sheet steel in the salt spray test to DIN 50021, i.e. better corrosion protection improvement in adhesion of the organic coating on the metallic substrate assessed by the T-bend test (ECCA standard) and impact test (ECCA standard)

sufficient corrosion protection even with a thin Cr coating, preferably using Cr-free pretreatment methods cavity sealing with wax or products containing waxes, which is still conventional, should become superfluous thanks to the improved corrosion protection suitability for spot welding.

The solution to this problem according to the present invention is stated in the claims. The present solution essentially comprises the provision of coating compositions containing 10 to 40 wt. % of an organic binder, 0 to 15 wt. % of a silicate-based anti-corrosive pigment, 40 to 70 wt. % of powdered zinc, aluminum, graphite and/or molybdenum disulfide, together with 0 to 30 wt. % of a solvent, wherein the organic binder consists of at least one epoxy resin, at least one curing agent selected from guanidine, substituted guanidines, substituted ureas, cyclic tertiary amines and mixtures thereof, together with at least one blocked polyurethane resin.

The solution according to the present invention also comprises the use of the above-stated composition for coating sheet metal in the coil coating process.

The solution according to the present invention furthermore comprises a process for coating metal surfaces with a conductive organic anti-corrosive layer characterised by the following stages:

conventional pretreatment consisting of
  cleaning
  optionally phosphating
  chromating
  optionally chromium-free pretreatment
coating with a composition of the above-stated type to a film thickness of 1 to 10 μm, preferably of between 2 and 5 μm
stoving of the organic coating at temperatures of between 160° C. and 260° C. peak metal temperature (PMT).

DETAILED DESCRIPTION OF THE INVENTION

The metal surfaces to be coated according to the present invention are preferably iron (sheet steel), galvanised and alloy-galvanised steels, aluminum or magnesium.

For the purposes of the present invention, an electrically conductive coating should be taken to mean one which is weldable under joining conditions conventional in the automotive industry, preferably using the spot welding process. These coatings furthermore have sufficient conductivity to ensure complete deposition of electrocoating lacquers.

The epoxy resin is an essential constituent of the organic binder of the anti-corrosive composition according to the present invention. An epoxy resin or a blend of two or more epoxy resins may be used here. The epoxy resin or resins may have a molecular weight of between 300 and 100000, with epoxy resins having at least two epoxy groups per molecule and a molecular weight of above 700 preferably being used, as experience has shown the higher molecular weight epoxies to give rise to no occupational hygiene problems during application. Numerous epoxy resins may in principle be used, such as the glycidyl ethers of bisphenol A or the glycidyl ethers of novolac resins. Examples of the first-stated type are commercially available under the trade names "EPICOTE 1001", "EPICOTE 1004", "EPICOTE 1007" and "EPICOTE 1009" from Shell Chemie. Numerous other conventional commercial epoxy resins of the bisphenol A glycidyl ether type may also be used, as well as the above-stated epoxy resins.

Examples of novolac epoxy resins are the "ARALDITE" ECN grades from Ciba Geigy, DEN grades from Dow Chemical and numerous other manufacturers.

Polyesters bearing epoxy groups, which also includes the epoxy derivatives of dimeric fatty acids, may also be used as an epoxy resin binder component.

These epoxy resins to be used according to the present invention are preferably solid in the solvent-free state at room temperature; during production of the composition, they are used as a solution in an organic solvent.

The curing agent or agents for the organic binder may be guanidine, substituted guanidines, substituted ureas, melamine resins, guanamine derivatives, cyclic tertiary amines, aromatic amines and mixtures thereof. The curing agents may here not only be included stoichiometrically in the curing reaction, but may also be catalytically active. Examples of substituted guanidines are methylguanidine, dimethylguanidine, trimethylguanidine, tetramethylguanidine, methylisobiguanidine, dimethylisobisguanidine, tetramethylisobiguanidine, hexamethylisobiguanidine, heptamethylisobiguanidine and cyanoguanidine. Examples of suitable melamine resins are methoxymethylmethylolmelamine, hexamethoxymethylmelamine, methoxymethylmelamine, hexamethoxymethylmelamine. Examples of suitable guanamine derivatives which may be mentioned are alkylated benzoguanamine resins, benzoguanamine resins or methoxymethyl/ethoxymethylbenzoguanamine.

Examples of catalytically active substituted ureas are in particular p-chlorophenyl-N,N-dimethylurea (Monuron) or 3,4-dichlorophenyl-N,N-dimethylurea (Diuron). Examples of catalytically active tertiary alkylamines are tris (dimethylaminomethyl)phenol, piperidine and derivatives thereof, diethanolamines and various imidazole derivatives. Representatives of the many usable imidazole derivatives which may be mentioned are: 2-ethyl-4-methylimidazole (EMI). N-butylimidazole, benzimidazole, N—$C_1$ to $C_{12}$ alkylimidazoles. Further examples of tertiary amine derivatives are aminooxadiazole, tertiary amine oxides, diaza aromatic tertiary amines, such as methylpyrazines, diallyltetrahydrodipyridyl and hydrogenated pyridine bases. Less reactive diamines may furthermore be present as a curing agent component, in particular aromatic diamines, such as diaminodiphenyl sulfone, 4,4'-methylene dianiline, m-phenylene diamine or also polyoxyalkylene polyamines of the "JEFFAMINE" type and similar diamines.

Blocked polyurethane resins for the purposes of the present invention are di- or poly-isocyanate compounds, which are obtained in a manner known per se by reacting aliphatic, alicyclic or aromatic isocyanates having at least 2 isocyanate groups per molecule with polyols, wherein in this first stage the isocyanate groups are used in stoichiometric excess relative to the alcohol groups. In a subsequent stage, the remaining isocyanate groups are then reacted in a known manner with blocking agents for the isocyanate groups. Examples of isocyanates which may be mentioned are: m-phenylene diisocyanate, p-phenylene diisocyanate, 2,4-tolylene diisocyanate (TDI), 2,6-tolylene diisocyanate (TDI), p-xylene diisocyanate, diphenylmethane diisocyanate (MDI), hexamethylene diisocyanate, dimeric acid diisocyanate, 1-isocyanatomethyl-3-isocyanato-1,5,5-trimethylcyclohexane (IPDI), hydrogenated MDI ($H_{12}$MDI), tetramethylxylylene diisocyanate (TMXDI), the biuretisation product of hexamethylene diisocyanate, the isocyanuratisation product of hexamethylene diisocyanate and the isocyanuratisation product of IPDI.

Dihydric alcohols, such as ethylene glycol, propylene glycol, butanediol, hexanediol, and the hydroxy-functional reaction products thereof with dicarboxylic acids (polyester polyols) or the alkoxylation products thereof with ethylene oxide and/or propylene oxide or mixtures thereof (polyether polyols) may be used as the polyol. The above-stated dihydric alcohols may here be entirely or partially replaced by trihydric starter alcohols, such as glycerol or trimethylolpropane, or tetrahydric alcohols, such as pentaerythritol.

Hydroxy-functional acrylate and/or methacrylate homo- or co-polymers may also be used as the polyol component.

Any known blocking agents may be used as the blocking agent (protective group) for the isocyanate groups remaining after the reaction of the polyisocyanate with the polyol, the following being mentioned by way of example, lower aliphatic monoalcohols, such as methanol, ethanol, propanol, butanol or octyl alcohol, together with monoethers of ethylene glycol and/or diethylene glycol, aromatic hydroxy compounds, such as phenol, alkylphenols or (alkyl)cresols. Oximes, such as acetone oxime, methyl ethyl ketone oxime and the like, may also be used as a blocking agent. Lactam blocking agents which may be mentioned are ε-caprolacatam, while CH-acidic β-dicarbonyl compounds, such as malonic esters, may also be considered as blocking agents.

Particularly preferred organic binders are those which contain a blocked polyurethane resin based on the more highly reactive aromatic polyisocyanates, in particular MDI, blended with a blocked polyurethane resin based on aliphatic polyisocyanates, in particular IDPI or TMXDI.

The anti-corrosive composition additionally contains 0 to 30 wt. % of a solvent or solvent mixture, wherein a proportion of this solvent or solvent mixture may already be introduced by the epoxy resin component or polyurethane resin component, in particular if conventional commercial binder components are used for this purpose. Suitable solvents are any solvents conventional in the lacquer industry based on ketones, such as methyl ethyl ketone, methyl isobutyl ketone, methyl n-amyl ketone, ethyl amyl ketone, acetylacetone, diacetone alcohol. Aromatic hydrocarbons, such as toluene, xylene or mixtures thereof, may also be used, as may aliphatic hydrocarbon mixtures having boiling points between about 80 and 180° C. Further suitable solvents are, for example, esters, such as ethyl acetate, n-butyl acetate, isobutyl isobutyrate, or alkoxyalkyl acetates, such as methoxypropyl acetate or 2-ethoxyethyl acetate. Monofunctional alcohols, such as isopropyl alcohol, n-butanol, methyl isobutyl carbinol or 2-ethoxyethanol, or monoalkyl ethers of ethylene glycol, diethylene glycol or propylene glycol may also be mentioned as representatives of many suitable solvents. It may be convenient to use mixtures of the above-stated solvents.

The conductive and weldable anti-corrosive composition furthermore contains finely divided conductive extenders in quantities of between 40 and 70 wt. %. Powdered zinc, powdered aluminum, graphite and/or molybdenum disulfide, carbon black, iron phosphide or $BaSO_4$ doped with tin or antimony may be mentioned by way of example.

0 to 15 wt. % of silicate-based anti-corrosive pigments may additionally be used. Such anti-corrosive pigments are known and zinc/calcium/aluminum/strontium polyphosphate silicate hydrate, zinc/boron/tungsten silicate, doped $SiO_2$ may be mentioned by way of example.

Familiar known additives, such as lubricants, soluble dyes or colouring pigments, together with wetting agents and levelling auxiliaries, may also be used.

The conductive, weldable anti-corrosive compositions according to the present invention are in particular suitable for coating sheet metal using the coil coating process. To this end, the sheet metal is initially subjected to conventional pretreatment processes, such as cleaning and degreasing. Conventional phosphating processes and chromating processes may optionally subsequently be performed. A particular advantage of the anti-corrosive compositions according to the present invention is that chromium-free pretreatment processes may also be used with success.

After the pretreatment, coating with the anti-corrosive composition according to the present invention is performed using a conventional coil coating process. Film thicknesses (dry film thicknesses) of 1 to 10 μm, in particular of 2 to 5 μm are particularly preferred. The organic coating is stoved at temperatures of between 160° C. and 260° C. peak metal temperature (PMT), preferably between 180° C. and 235° C. PMT.

EXAMPLES

The following Examples are intended to illustrate the present invention in greater detail. Unless otherwise indicated, all quantities in the compositions are stated as parts, by weight.

The compositions listed in Table 1 according to Examples 1 to 10 are produced by mixing together the binder, curing agent, extenders, pigments, solvents and additives. A proportion of the solvent was here already introduced into the composition with the solvent-borne polyurethane binder or curing agent. Mixing was performed in mixing units conventional in the lacquer sector (high speed stirrers) until a homogeneous composition was obtained.

0.8 mm thick sheet steel (ZE 50/50) was provided in a conventional manner with no-rinse chromating using "GRANODINE 4513" (Henkel) and then coated with the organic conductive coatings according to the present invention such that a dry film thickness of about 3 μm was obtained. The stoving temperature was about 215° C. PMT. The sheet metal coated in this manner was then provided with a conventional cathodic electrocoating, whereupon this coating was fully cured according to the prior art.

As is evident from the test results in Table 2 all the coatings according to the present invention have an excellent anti-corrosive action. The organic coatings according to the present invention are moreover sufficiently resistant to conventional solvents (methyl ethyl ketone), as is evident from the MEK test.

In comparative tests, the adhesion performance of the present composition according to Example 11 was compared with a prior art composition. As is clear from the test results in Table 3, both the compositions according to the present invention and the prior art comparison composition have a good anti-corrosive action, provided that the coated substrates are not subjected to mechanical stress. The substrates in the tests according to Table 3 were pretreated in a similar manner to that described above by no-rinse chromating, wherein phosphating was omitted. Since the adhesion performance of these coatings was to be tested, a cathodic electrocoating was not applied. As is evident from the results in Table 3, the coating according to the present invention according to Example 11 is distinctly superior to the prior art both under impact loading (reverse impact) and in flexural testing (T-bend) and in abrasion testing.

TABLE 1

| Example | 1 | 2 | 3 | 4 | 5 | 6 | 7 | 8 | 9 | 10 |
|---|---|---|---|---|---|---|---|---|---|---|
| PUR binders | | | | | | | | | | |
| Blocked polyurethane based on TDI polyesterol | 6.5 | 0 | 0 | 6.5 | 0 | 6.5 | 0 | 6.5 | 0 | 7 |
| Blocked polyurethane based on IPDI polyesterol | 0 | 5 | 0 | 0 | 0 | 0 | 5 | 0 | 6.5 | 0 |
| Blocked polyurethane based on HDI polyesterol | 0 | 0 | 0 | 0 | 8 | 0 | 4 | 0 | 0 | 5 |
| Blocked polyurethane based on MDI polyesterol | 0 | 5.3 | 7 | 0 | 0 | 0 | 0 | 0 | 9 | 0 |
| Bisphenol A based epoxy resin | 5.5 | 2.5 | 4 | 5.5 | 5 | 6 | 5 | 5.5 | 0 | 4 |
| Curing agents | | | | | | | | | | |
| Cyanoguanidine | 1 | 1.5 | 0 | 0 | 0 | 1 | 0 | 0 | 0 | 1 |
| Hexamethoxymethylmelamine | 0 | 0 | 2 | 0 | 0 | 0 | 3 | 0 | 0 | 0 |
| Benzoguanamine | 0 | 0 | 0 | 0 | 5 | 0 | 0 | 5 | 0 | 0 |
| Polyoxyalkylenetriamines | 0 | 0 | 0 | 2 | 0 | 0 | 0 | 0 | 2 | 0 |
| Conductive extenders/pigments | | | | | | | | | | |
| Zinc powder | 50 | 60 | 50 | 60 | 50 | 60 | 40 | 40 | 35 | 35 |
| Carbon black | 0 | 0.2 | 0 | 0 | 0 | 0 | 0 | 0 | 0 | |
| Aluminum flake | 0 | 0 | 0 | 0 | 5 | 0 | 5 | 5 | 0 | 0 |
| Molybdenum disulfide | 1.5 | 0 | 2.5 | 0 | 0 | 0 | 0 | 0 | 0 | 0 |
| Iron phosphide | 0 | 0 | 0 | 0 | 0 | 0 | 0 | 0 | 20 | 15 |
| SnO/SbO doped barium sulfate | 0 | 0 | 0 | 0 | 0.5 | 5 | 0 | 0 | 0 | 0 |
| Anti-corrosive pigments | | | | | | | | | | |
| Zn/Ca/Al/Sr polyphosphate silicate hydrate | 0 | 0 | 3 | 5.5 | 0 | 0 | 6 | 0 | 0 | 0 |
| Zinc/boron/tungsten silicate | 0 | 0 | 4 | 0 | 2 | 0 | 0 | 0 | 0 | 5 |
| Doped silica | 6 | 6 | 2 | 0 | 0 | 0 | 0 | 6 | 5 | 0 |
| Solvents | | | | | | | | | | |
| 1-Methoxy-2-propyl acetate | 7 | 6 | 5 | 5 | 7 | 7 | 10 | 10 | 9 | 8 |
| Diacetone alcohol | 5 | 5 | 10 | 7 | 5 | 5 | 7 | 7 | 5 | 6 |
| Solvesso 200 | 3 | 0 | 0 | 0 | 0 | 9 | 5 | 5 | 3 | 5 |
| Solvesso 100 | 14 | 0 | 0 | 0 | 2 | 0 | 0 | 0 | 5.5 | 0 |
| Solvesso 150 | 0 | 8 | 10 | 8 | 10 | 0 | 10 | 10 | 0 | 9 |
| Additives | | | | | | | | | | |
| Phthalocyanine pigment | 0.1 | 0 | 0 | 0 | 0 | 0.2 | 0 | 0 | 0 | 0 |
| Modified castor oil | 0.2 | 0.3 | 0.2 | 0.2 | 0.2 | 0.3 | 0 | 0 | 0 | 0 |
| Dispersion auxiliary | 0.2 | 0.2 | 0.3 | 0.3 | 0.3 | 0 | 0 | 0 | 0 | 0 |
| Total | 100 | 100 | 100 | 100 | 100 | 100 | 100 | 100 | 100 | 100 |

TABLE 2

Test results

| Example | 1 | 2 | 3 | 4 | 5 | 6 | 7 | 8 | 9 | 10 |
|---|---|---|---|---|---|---|---|---|---|---|
| Pigment/binder ratio | 4.4 | 4.6 | 4.7 | 4.7 | 3.2 | 4.8 | 3.0 | 3.0 | 3.4 | 3.2 |
| Solids content (wt. %) | 71 | 81 | 75 | 80 | 76 | 79 | 68 | 68 | 77.5 | 72 |
| Binder content (wt. %) | 13 | 14.3 | 13 | 14 | 18 | 13.5 | 17 | 17 | 17.5 | 17 |
| Red rust in flange[1] | rO | rO | rO | rO | rO | rO | rO | rO | rO | rO |
| Creepage[2] | <1.5 mm | <1.5 mm | <1.5 mm | <1.5 mm | <1.5 mm | <1.5 mm | <1.5 mm | <1.5 mm | <1.5 mm | <1.5 mm |
| MEK test[3] | >10 DH | >10 DH | >10 DH | >10 DH | >10 DH | >10 DH | >10 DH | >10 DH | >10 DH | >10 DH |

Comments
[1] After 10 cycles, VDA 621-416, evaluation in accordance with Daimler-Benz specification.
[2] After 10 cycles, VDA 621-415, evaluation similar to DIN 53167
[3] Pursuant to DIN 53339, DH = to-&-fro stroke, not cathodically electrocoated.

TABLE 3

Comparative tests

| Example | 11 | Comp. |
|---|---|---|
| Blocked polyurethane based on TDI polyesterol | 10.5 | 6.5 |
| Bisphenol A based epoxy resin | 2.5 | 5.5 |
| Cyanoguanidine | 1 | 0 |
| Zinc powder | 50.5 | 50.5 |
| Molybdenum disulfide | 2 | 2 |
| Doped silica | 6 | 6 |
| 1-Methoxy-2-propyl acetate | 8 | 8 |
| Diacetone alcohol | 9 | 8 |
| Solvesso 200 | 2 | 2 |
| Solvesso 100 | 0 | 11 |
| Solvesso 150 | 8 | 0 |
| Phthalocyanine pigment | 0.1 | 0.1 |

TABLE 3-continued

Comparative tests

| Example | 11 | Comp. |
|---|---|---|
| Modified castor oil | 0.2 | 0.2 |
| Dispersion auxiliary | 0.2 | 0.2 |
| Total | 100 | 100 |
| Reverse impact (2 kg/m)[1] | 0 | 3 |
| MEK test, to-&-fro strokes[2] | >10 | >10 |
| T-bend at t = 0[3] | 1 | 3 |
| Abrasion (g/m² on bowl)[4] | 1 | 2.5 |
| SS test to red rust[5] | >600 h | >600 h |

[1]According to ECCA T 6, evaluation scale to DIN 53230 where 0 = best value and 5 = 0 very poor.
[2]Pursuant to DIN 53339.
[3]According to ECCA T 20 (mandrel bending test with bending radius t = 0 mm), evaluation to DIN 53230.
[4]A bowl-shaped indentation was drawn in sheet metal provided with the cured coating and the missing quantity of coating determined.
[5]Salt spray test to DIN 53167, evaluation to DIN 50021.

What is claimed is:

1. An electrically conductive and weldable anti-corrosive coating composition useful for coating metal surfaces comprising:
    (a) an organic binder comprised of
        (aa) at least one epoxy resin;
        (bb) at least one curing agent; and
        (cc) at least one blocked polyurethane resin;
    (b) an electrically conductive amount of one or more finely divided electrically conductive extenders selected from the group consisting of zinc, aluminum, graphite. molybdenum disulfide, carbon black, iron phosphide, tin-doped barium sulfate, antimony-doped barium sulfate, and mixtures thereof, and,
    optionally, one or more additional components selected from
        (i) up to 15 weight % of at least one silicate-based anti-corrosive pigment, and
        (ii) up to 30 weight % of at least one solvent,
    said electrically conductive amount being an amount sufficient to cause the coating composition to be electrically conductive when adhered to such metal surface.

2. The anti-corrosive coating composition of claim 1 wherein at least one curing agent is selected from the group consisting of guanidine, substituted guanidines, substituted ureas, melamine resins, guanamine derivatives, cyclic tertiary amines, aromatic amines, tertiary alkylamines, and mixtures thereof.

3. The anti-corrosive coating composition of claim 1 wherein at least one curing agent is selected from the group consisting of methylguanidine, dimethylguanidine, methylisobiguanidine, tetramethylisobiguanidine, heptamethylisobiguanidine, cyanoguanidine, N'-dichlorophenyl-N,N-dimethyl urea, N'-chlorophenyl-N,N-dimethyl urea, imidazole, alkyl imidazoles, arylimidazoles, hexamethoxymethylmelamine, benzoguanamine and polyoxyalkylenetriamines.

4. The anti-corrosive coating composition of claim 1 comprising from 10 to 40 weight % of said organic binder.

5. The anti-corrosive coating composition of claim 1 wherein at least one epoxy resin is an epoxy based on bisphenol A glycidyl ether and having a molecular weight of at least 700.

6. The anti-corrosive coating composition of claim 1 wherein the blocked polyurethane resin is obtained by reacting a stoichiometric excess of one or more isocyanates having at least 2 isocyanate groups with one or more polyols, wherein at least one of said polyols is a polyester polyol, to obtain a polyester prepolymer having isocyanate end groups and blocking the isocyanate end groups of the polyester prepolymer with one or more blocking agents.

7. The anti-corrosive coating composition of claim 6 wherein at least one of the isocyanates is selected from the group consisting of TDI, MDI, IPDI, HDI and combinations thereof.

8. The anti-corrosive coating composition of claim 6 wherein at least one of the blocking agents is selected from the group consisting of lower aliphatic monoalcohols, monoethers of ethylene glycol and diethylene glycol, aromatic hydroxy compounds, oximes, lactams, and CH-acidic β-dicarbonyl compounds.

9. The anti-corrosive coating composition of claim 1 comprising 40 to 70 weight % of finely divided electrically conductive extender.

10. The anti-corrosive coating composition of claim 1 additionally comprising one or more silicate-based anti-corrosive pigments.

11. The anti-corrosive coating composition of claim 1 additionally comprising one or more solvents.

12. A process for protecting a metal surface against corrosion, said process comprising
    (1) cleaning the metal surface;
    (2) coating the metal surface with an electrically conductive and weldable anti-corrosive coating composition comprising;
        (a) 10 to 40 weight. % of an organic binder comprised of
            (i) at least one epoxy resin;
            (ii) at least one curing agent; and
            (iii) at least one blocked polyurethane resin;
        (b) 40 to 70 weight % of one or more finely divided electrically conductive extenders selected from the group consisting of zinc, aluminum, graphite, molybdenum disulfide, carbon black, iron phosphide, tin-doped barium sulfate, antimony-doped barium sulfate, and mixtures thereof, and,
        optionally, one or more components selected from
            (i) up to 15 weight % of at least one silicate-based anti-corrosive pigment, and
            (ii) up to 30 weight % of at least one solvent; and
    (3) stoving the metal surface coated with the anti-corrosive coating composition.

13. The process of claim 12 wherein the anti-corrosive coating composition coated on the metal surface has a film thickness of 1 to 10 um.

14. The process of claim 12 wherein step (3) is performed at a peak metal temperature of between 160° C. and 260° C.

15. The process of claim 12 wherein the metal surface is selected from the group consisting of sheet steel, galvanized steel, alloy-galvanized steel, aluminum and magnesium.

16. The process of claim 12 wherein the metal surface is phosphated prior to step (2).

17. The process of claim 12 wherein the metal surface is chromated prior to step (2).

18. The process of claim 12 wherein the metal surface is pretreated using a chromium-free pretreatment process prior to step (2).

19. An electrically conductive and weldable anti-corrosive coating composition useful for coating metal surfaces comprising:
    (a) 10 to 40 weight % of an organic binder comprised of
        (aa) at least one epoxy resin;
        (bb) at least one curing agent selected from guanidine, substituted guanidines, substituted ureas, cyclic ter tiary amines, and mixtures thereof;
(cc) at least one blocked polyurethane resin;
(b) 0 to 15 weight % of at least one silicate-based anti-corrosive pigment;
(c) 40 to 70 weight % of one or more finely divided electrically conductive extenders selected from the group consisting of zinc, aluminum, graphite, molybdenum disulfide, carbon black iron phosphide, tin-doped barium sulfate, antimony-doped barium sulfate, and mixtures thereof;
(d) 0 to 30 weight % of at least one solvent.

20. A process for protecting a surface of sheet steel against corrosion, said process comprising
(a) cleaning the surface;
(b) coating the surface with the anti-corrosive coating composition of claim 19 to a film thickness of 1 to 10 um;
(c) stoving the surface coated with the anti-corrosive coating composition to a peak metal temperature of between 160° C. to 260° C.

* * * * *

UNITED STATES PATENT AND TRADEMARK OFFICE
CERTIFICATE OF CORRECTION

PATENT NO. : 6,479,103 B1
DATED : November 12, 2002
INVENTOR(S) : Wichelhaus et al.

It is certified that error appears in the above-identified patent and that said Letters Patent is hereby corrected as shown below:

Column 10,
Line 48, delete "um", and insert therefor -- $\mu$m --.

Column 11,
Line 8, after "carbon black", insert therefor -- , --.

Column 12,
Line 6, delete "um", and insert therefor -- $\mu$m --.

Signed and Sealed this

Thirteenth Day of May, 2003

JAMES E. ROGAN
*Director of the United States Patent and Trademark Office*